United States Patent
Jiang et al.

(10) Patent No.: US 11,564,234 B2
(45) Date of Patent: Jan. 24, 2023

(54) INFORMATION SENDING/RECEIVING METHOD, APPARATUS, DEVICE, AND READABLE STORAGE MEDIUM

(71) Applicant: ZTE CORPORATION, Guangdong (CN)

(72) Inventors: Chuangxin Jiang, Shenzhen (CN); Shujuan Zhang, Shenzhen (CN); Zhaohua Lu, Shenzhen (CN); Huahua Xiao, Shenzhen (CN); Wenjun Yan, Shenzhen (CN); Hao Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/168,981

(22) Filed: Feb. 5, 2021

(65) Prior Publication Data
US 2021/0160882 A1    May 27, 2021

Related U.S. Application Data

(63) Continuation of application No. PCT/CN2019/099820, filed on Aug. 8, 2019.

(30) Foreign Application Priority Data

Aug. 8, 2018 (CN) .......................... 201810897926.3

(51) Int. Cl.
*H04W 72/04* (2009.01)
*H04W 80/02* (2009.01)

(52) U.S. Cl.
CPC ..... *H04W 72/0493* (2013.01); *H04W 72/042* (2013.01); *H04W 72/0446* (2013.01); *H04W 72/0453* (2013.01); *H04W 80/02* (2013.01)

(58) Field of Classification Search
CPC ........... H04W 72/049; H04W 72/0493; H04W 72/042; H04W 72/0446; H04W 72/0453;
(Continued)

(56) References Cited

U.S. PATENT DOCUMENTS 8,731,478 B2 * 5/2014 Ren ........................ H04W 24/10
455/67.11
9,391,736 B2 * 7/2016 Nayeb Nazar ........ H04W 72/10
(Continued)

FOREIGN PATENT DOCUMENTS

CN    103974430 A    8/2014
CN    107431591 A    12/2017
(Continued)

OTHER PUBLICATIONS

Intel Corporation: "On QCL for Different BW Parts and Other QCL Details" 3GPP TSG RAN WG1 NR Ad-Hoc#2 R1-1710539, Jun. 30, 2017 (Jun. 30, 2017), Qingdao, P.R. China (5 pages).
(Continued)

*Primary Examiner* — Jung H Park
(74) *Attorney, Agent, or Firm* — Foley & Lardner LLP

(57) ABSTRACT

Provided are an information transmission/receiving method, apparatus, device and a readable storage medium. The method includes: establishing an association relationship among parameters configured for a user equipment (UE), where various parameters with the association relationship belongs to a same parameter group, and the parameters configured for the UE include at least one of: multiple component carriers (CCs), multiple bandwidth parts (BWPs), configuration parameters in one or more CCs or sub-parameters of the configuration parameters in one or more CCs, or configuration parameters of one or more
(Continued)

BWPs or sub-parameters of the configuration parameters in one or more BWPs; and transmitting information of the parameter group to the UE.

13 Claims, 4 Drawing Sheets

(58) Field of Classification Search
CPC .............. H04W 80/02; H04W 72/1289; H04L 5/0044; H04L 5/0051; H04L 5/0053; H04L 5/0094; H04L 5/001; H04B 7/0695
See application file for complete search history.

(56) References Cited

U.S. PATENT DOCUMENTS

| | | | |
|---|---|---|---|
| 9,414,405 B2* | 8/2016 | Kim | H04L 5/0035 |
| 2011/0249578 A1* | 10/2011 | Nayeb Nazar | H04W 24/10 370/252 |
| 2012/0257531 A1 | 10/2012 | Ko et al. | |
| 2013/0163553 A1* | 6/2013 | Lee | H04L 5/0091 370/329 |
| 2014/0098779 A1* | 4/2014 | Kim | H04L 5/0035 370/329 |
| 2015/0078284 A1* | 3/2015 | Lee | H04L 1/0026 370/329 |
| 2016/0218788 A1* | 7/2016 | Yum | H04B 7/0626 |
| 2017/0251461 A1* | 8/2017 | Parkvall | H04W 72/0406 |
| 2017/0338932 A1 | 11/2017 | Lee et al. | |
| 2018/0034526 A1* | 2/2018 | Lee | H04B 7/0647 |
| 2018/0183551 A1* | 6/2018 | Chou | H04L 5/0098 |
| 2018/0198590 A1* | 7/2018 | Lee | H04L 1/1671 |
| 2018/0269939 A1* | 9/2018 | Hu | H04W 74/0833 |
| 2018/0270799 A1* | 9/2018 | Noh | H04L 1/1812 |
| 2018/0324773 A1* | 11/2018 | Fu | H04L 5/0082 |
| 2018/0343642 A1* | 11/2018 | Lee | H04L 5/0053 |
| 2019/0036673 A1* | 1/2019 | Chen | H04L 5/001 |
| 2019/0053103 A1* | 2/2019 | Manolakos | H04L 5/0042 |
| 2019/0082424 A1* | 3/2019 | Nammi | H04W 28/06 |
| 2021/0266944 A1* | 8/2021 | Noh | H04L 5/0094 |

FOREIGN PATENT DOCUMENTS

| | | |
|---|---|---|
| JP | 2017-118561 A | 6/2017 |
| JP | 2020-503764 A | 1/2020 |
| WO | WO-2018/128446 A1 | 7/2018 |
| WO | WO-2018/203718 A1 | 11/2018 |

OTHER PUBLICATIONS

International Search Report and Written Opinion for PCT Appl. No. PCT/CN2019/099820 dated Oct. 29, 2019 (with English translation, 11 pages).
VIVO: "Remaining Issues on Non-CA UL Power Control" 3GPP TSG RAN WG1 Meeting #92bis R1-1803842, Apr. 20, 2018 (Apr. 20, 2018),Sanya, China (5 pages).
First Exam Report on AU 2019316869 dated Oct. 14, 2021 (3 pages).
Extended European Search Report for EP Appl. No. 19847527.9, dated Sep. 30, 2021 (10 pages).
Intel Corporation: "On BWP reconfiguration" 3GPP TSG-EAN WG4 Meeting #85; R4-1712875; Dec. 1, 2017; Reno, USA (5 pages).
Intel Corporation: "Proposed changes for BWP related specification descriptions" 3GPP TSG RAN WG1 Meeting AH 1801; R1-1800337; Jan. 26, 2018; Vancouver, Canada (6 pages).
Qualcomm Incorporated: "Remaining issues on BWP" 3GPP TSG RAN WG1 Meeting #93; R1-1807368; May 25, 2018; Busan, Korea (19 pages).
First Office Action for JP Appl. No. 2021-506438, dated Mar. 22, 2022 (with English translation, 18 pages).
Huawei et al., "Remaining details of QCL assumptions" 3GPP TSG RAN WG1 Meeting #91, R1-1719443, Dec. 1, 2017, Reno, USA (8 pages).
Nokia et al., "Remaining details on multi-TRP transmission" 3GPP TSG RAN WG1 NR Ad Hoc #3, R1-1716494, Sep. 21, 2017, Nagoya, Japan (8 pages).
Penultimate Office Action for JP Appl. No. 2021-506438, dated Oct. 26, 2022 (with English translation, 8 pages).

* cited by examiner

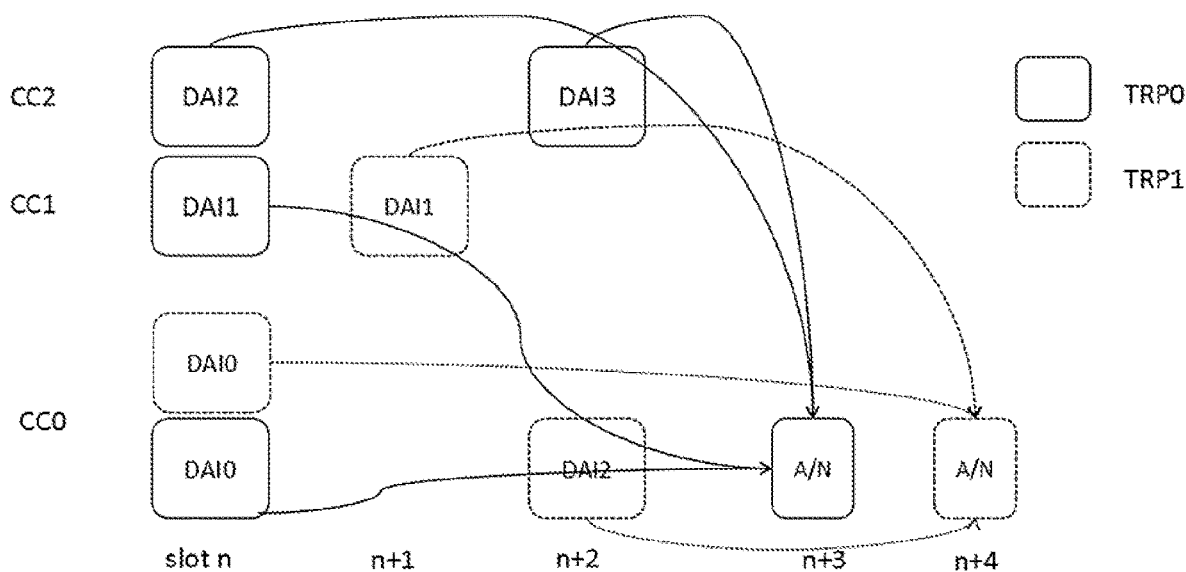
FIG. 6
Receive information of a parameter group configured for a user equipment (UE) and an association relationship among parameters configured for the UE, where various parameters with the association relationship belong to a same parameter group — S701
FIG. 7
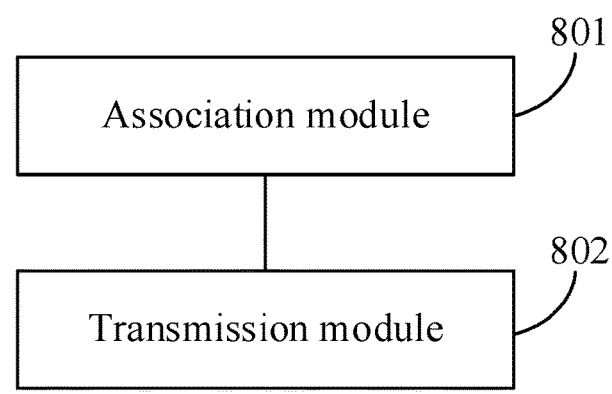
FIG. 8

INFORMATION SENDING/RECEIVING METHOD, APPARATUS, DEVICE, AND READABLE STORAGE MEDIUM

CROSS REFERENCE TO RELATED APPLICATIONS

This application claims the benefit of priority under 35 U.S.C. § 120 as a continuation of PCT Patent Application No. PCT/CN2019/099820, filed on Aug. 8, 2019, which claims priority to Chinese patent application no. 201810897926.3, filed on Aug. 8, 2018, the disclosure of each of which is incorporated herein by reference in its entirety.

TECHNICAL FIELD

The present application relates to a field of data transmission technology, in particular, to an information transmission/receiving method, apparatus, device and a readable storage medium.

BACKGROUND

In a New Radio (NR) Release-15 version, a joint transmission of multiple transmission receive points (TRPs) has not been fully discussed, in particularly, there is little discussion on a scenario where multiple TRPs have no dynamic interaction. Therefore, the NR version does not support the solution in which multiple TRPs perform data transmission on a same user.

SUMMARY

The present application provides an information transmission/receiving method, apparatus, device and a readable storage medium. For a scenario where multiple TRPs have no ideal backhaul, a new signaling design is proposed to support a solution of multiple downlink control information (DCI) scheduling.

The present disclosure provides an information transmission method. The method includes steps described below.

An association relationship among parameters configured for a user equipment (UE) is established, where various parameters with the association relationship belong to a same parameter group.

The parameters configured for the UE include at least one of: multiple component carriers (CCs), multiple bandwidth parts (BWPs), configuration parameters in one or more CCs, or sub-parameters of the configuration parameters in one or more CCs, or configuration parameters in one or more BWPs or sub-parameters of the configuration parameters in one or more BWPs.

Information of the parameter group is transmitted to the UE.

The present disclosure further provides an information receiving method. The method includes steps described below.

Information of a parameter group configured for a user equipment (UE) and an association relationship among parameters configured for the UE are received, where various parameters with the association relationship belong to a same parameter group.

The parameters configured for the UE include at least one of: multiple component carriers (CCs), multiple bandwidth parts (BWPs), configuration parameters in one or more CCs or sub-parameters of the configuration parameters in one or more CCs, or configuration parameters in one or more BWPs or sub-parameters of the configuration parameters in one or more BWPs.

The present disclosure further provides a multi-point transmission method. The method includes steps described below.

Multiple physical uplink shared channels (PUSCHs) or multiple physical downlink shared channels (PDSCHs) scheduled by multiple pieces of downlink control information (DCI) in one bandwidth part (BWP) or component carrier (CC) are configured to have a same transmission block (TB).

The present application provides an information transmission/receiving method, an apparatus, a device and a readable storage medium. For a scenario where multiple TRPs have no ideal backhaul, a new signaling design is proposed to support multiple downlink control information (DCI) scheduling.

BRIEF DESCRIPTION OF DRAWINGS

FIG. 6 is a diagram of UCI having different correspondence feeding back on different slots in the second embodiment of the present application;

FIG. 7 is a flowchart of an information receiving method in a third embodiment of the present application;

FIG. 8 is a structure diagram of an information transmission apparatus in a fourth embodiment of the present application;

DETAILED DESCRIPTION

To further describe the technical means adopted for achieving predetermined purposes and the effects achieved in the present application, the present application is described below in conjunction with the drawings and embodiments.

Figure 1:
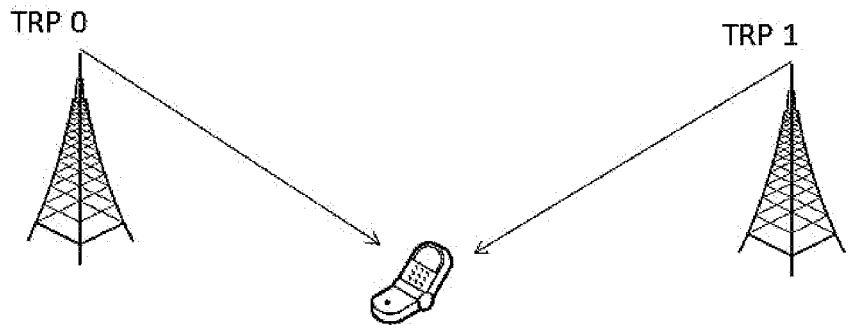
FIG. 1 is a schematic diagram of both two TRPs transmitting data to a same UE in a first embodiment of the present application.

In a NR Release-15, there is no consideration on a solution of the multiple transmission receive points (Multi-TRPs) transmission, that is multiple TRPs transmit data to a same user. As shown in FIG. 1, both two TRPs transmit the data to a user equipment (UE) of the same user. It should be noted that the two TRPs may transmit the data to the UE in a same time unit, or may transmit the data to the UE in different time units.

In a scenario where there is an ideal backhaul between a TRP0 and a TRP1, a serving cell (assuming to be the TRP0) of the UE may transmit a PDCCH to schedule multiple data streams, that is, multiple transport layers; when actually transmitting data streams, different layers may be transmitted by the TRP0 and the TRP1. For example, in a downlink control information format (DCI format 1_1) transmitted by the TRP0, 4 layers of data transmission are scheduled, corresponding to 4 demodulation reference signal ports (DMRS ports) respectively. 2 layers may come from the TRP0, and the other 2 layers may come from the TRP1. In this scenario, the transmission of multiple TRPs may be supported without major changes because two cooperative TRPs may interact dynamically, and the transmission of the control channel is mainly implemented by the serving cell.

However, in a scenario where there is no ideal backhaul between the two TRPs, the two cooperative TRPs cannot interact dynamically and can only interact semi-statically to avoid strong interference for implementing the Multi-TRPs joint transmission.

Figure 2:
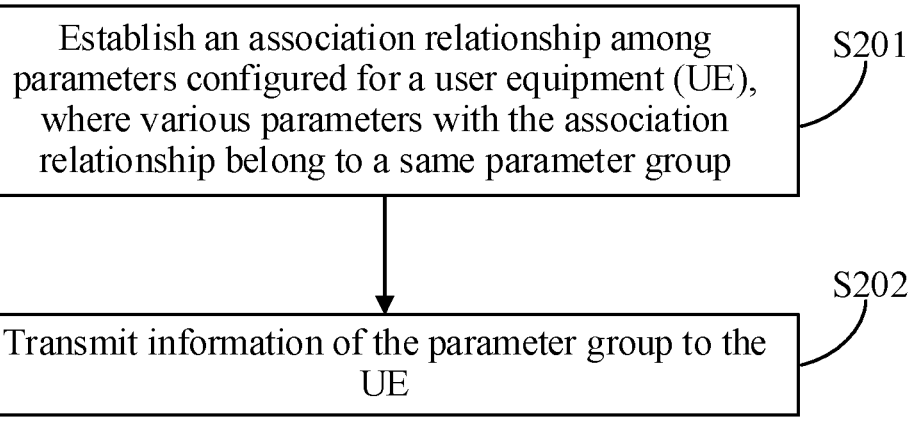
FIG. 2 is a flowchart of an information transmission method in the first embodiment of the present application.

In order to implement data transmission by multiple TRPs on a same UE, a first embodiment of the present application provides an information transmission method. As shown in FIG. 2, the method includes steps described below.

In step S201: an association relationship among parameters configured for a user equipment (UE) is established, where various parameters with the association relationship belong to a same parameter group.

The parameters configured for the UE include at least one of: multiple component carriers (CCs), multiple bandwidth parts (BWPs), configuration parameters in one or more CCs or sub-parameters of the configuration parameters in one or more CCs, or configuration parameters in one or more BWPs or sub-parameters of the configuration parameters in one or more BWPs.

In step S202, information of the parameter group is transmitted to the UE.

Based on a framework of NR protocol, under a configuration of a set of CCs or BWPs (assuming that multiple TRPs share the configuration of the set of CCs or BWPs), a solution for supporting the Multi-TRPs transmission includes extending or dividing the parameters configured for the UE into N parts, where N is a positive integer, where the extended or divided N parts of the parameters correspond to N TRPs respectively. For example, in FIG. 1, if there are two TRPs performing the joint transmission on one UE, then N=2. Since different TRPs may have different traffic loads, coverage, channel conditions, etc., parameter configurations for the UE may also be different. In this case, some configuration parameters of the UE are separately configured for N TRPs, which provides flexibility of the Multi-TRPs joint transmission.

In the embodiment of the present disclosure, the parameters configured for the UE are divided into N parameter groups, and various parameters in each parameter group have an association relationship. The parameters in different parameter groups are used for the data transmission of different TRPs, that is, each parameter group is allocated for each TRP, so as to implement the solution of data transmission performed by multiple TRPs on the same UE.

Figure 3:
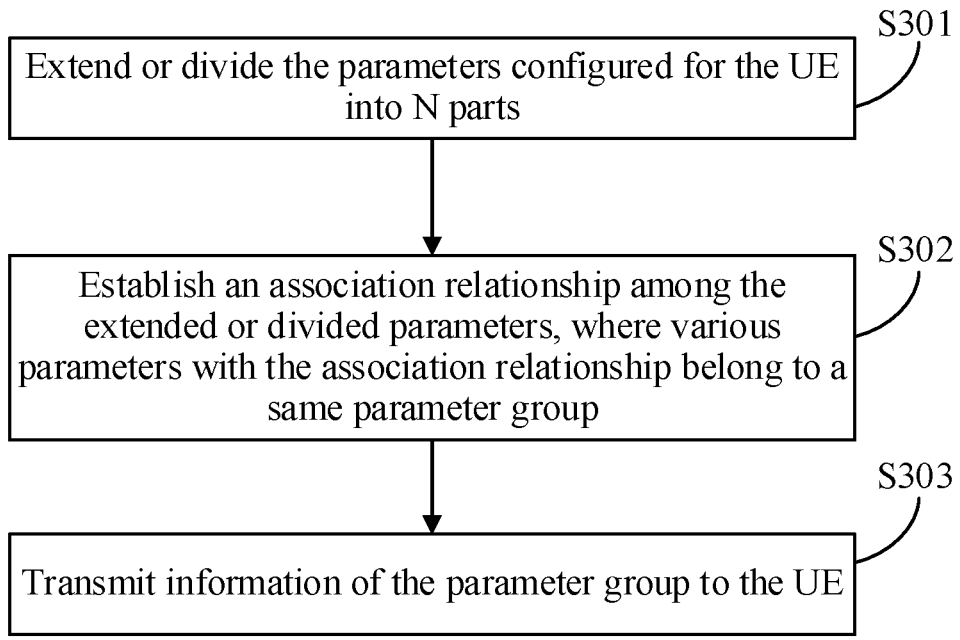
FIG. 3 is a flowchart of an information transmission method in a second embodiment of the present application.

A second embodiment of the present application provides an information transmission method. As shown in FIG. 3, the method includes steps described below.

In step S301: the parameters configured for the UE are extended or divided into N parts.

The parameters configured for the UE include at least one of: multiple component carriers (CCs), multiple bandwidth parts (BWPs), configuration parameters in one or more CCs or sub-parameters of the configuration parameters in one or more CCs, or configuration parameters in one or more BWPs or sub-parameters of the configuration parameters in one or more BWPs.

Based on the framework of NR protocol, under a configuration of a set of CCs or BWPs (assuming that multiple TRPs share the configuration of the set of CCs or BWPs), a solution for supporting the Multi-TRPs transmission includes extending or dividing the parameters configured for the UE into N parts, where N is a positive integer, where the extended or divided N parts of the parameters correspond to N TRPs respectively. For example, in FIG. 1, if there are two TRPs performing the joint transmission on one UE, then N=2. Since different TRPs may have different traffic loads, coverage, channel conditions, etc., parameter configurations for the UE may also be different. In this case, some configuration parameters of the UE are separately configured for N TRPs, which provides flexibility of the Multi-TRPs joint transmission.

In particular, the step S301 includes:

extending or dividing the multiple CCs or BWPs configured for the UE into N parts; or, extending or dividing the configuration parameters in one or more CCs configured for the UE or the sub-parameters of the configuration parameters in one or more CCs configured for the UE into N parts; or extending or dividing the configuration parameters in one or more BWPs configured for the UE or the sub-parameters of the configuration parameters in one or more BWPs configured for the UE into N parts.

Further, the extending or dividing the configuration parameters in one or more CCs configured for the UE or the sub-parameters of the configuration parameters in one or more CCs configured for the UE into N parts includes: extending or dividing configuration parameters in an uplink BWP and/or a downlink BWP or sub-parameters of the configuration parameters in an uplink BWP and/or a downlink BWP into N parts.

The configuration parameters of the uplink BWP include at least one of: configuration parameters of a physical uplink control channel (PUCCH), configuration parameters of a physical uplink shared channel (PUSCH), or configuration parameters of a channel sounding reference signal (SRS).

The configuration parameters in the downlink BWP include at least one of: configuration parameters of a physical downlink control channel (PDCCH) or configuration parameters of a physical downlink shared channel (PDSCH).

Optionally, since there is no dynamic interaction between N TRPs, it may not support one DCI to schedule dynamic data of the two TRPs. So N TRPs need to transmit N independent PDCCHs or N independent pieces of DCI to schedule their respective PDSCH. Therefore, configuration information of the PDCCHs is preferably to be separate from N TRPs. In this case, different TRPs may configure different control channels for the UE according to the condition. In addition, it can be seen from FIG. 1 that beams used by two TRPs to perform transmission on the same UE are different, so beams for transmitting the PDCCHs of the TRP0 and the TRP1 should be different too. In this case, the PDCCHs of the TRP0 and the TRP1 are preferred to be configured independently. For example, another pdcch-Config2 is added on the basis of a pdcch-Config in the related art, that is, the pdcch-Config is extended into two parts, corresponding to the cooperative cells TRP0 and TRP1 respectively, such as a design 1 described below. Alternatively, the pdcch-Config in the related art is extended into N parts, corresponding to PDCCH configurations of N TRPs, such as a design 2 described below.

```
Design 1:
    BWP-DownlinkDedicated ::=       SEQUENCE {
    pdcch-Config                    SetupRelease { PDCCH-Config }
OPTIONAL,-- Need M
    pdcch-Config2                   SetupRelease { PDCCH-Config }
    pdsch-Config                    SetupRelease { PDSCH-Config }    OPTIONAL,
    -- Need M
    sps-Config                      SetupRelease { SPS-Config }
OPTIONAL,   -- Need M
    radioLinkMonitoringConfig   SetupRelease  { RadioLinkMonitoringConfig }
OPTIONAL,-- Need M
    ...
    }
Design 2:
    BWP-DownlinkDedicated ::=       SEQUENCE {
    pdcch-Config    SEQUENCE (SIZE(1..N)) OF(SetupRelease { PDCCH-Config } pdsch-Config    SetupRelease { PDSCH-Config }        OPTIONAL,
    -- Need M
    sps-Config      SetupRelease { SPS-Config }
OPTIONAL,   -- Need M
    radioLinkMonitoringConfig SetupRelease { RadioLinkMonitoringConfig }
OPTIONAL,-- Need M
    ...
    }
```

For different BWPs or CCs, the number of N may be different. For example, on a CC0, two parts of pdcch-Config are configured to correspond to the transmission of two TRPs, but only one part of pdcch-Config is configured on a CC1 to correspond to the transmission of one TRP (that is, Multi-TRPs transmission is not supported). In this way, the flexibility is the highest. Multiple TRPs may selectively determine whether the Multi-TRPs joint transmission is required based on traffic loads and channel frequencies of different CCs. For example, the TRP1 has a large traffic volume on the CC1, so that the traffic load is high, so only one part of pdcch-Config corresponding to the TRP0 needs to be configured for the UE on the CC1, and the TRP1 does not need to transmit data to the UE on the CC1, that is, only the TRP0 performs a single-point transmission to the UE on the CC1.

Optionally, a beam configuration of the PDSCH is selected by medium access control (MAC) layer signaling (signaling of an MAC layer is transmitted through the PDSCH) and is dynamically notified by 0 to 3 bits of dynamic DCI. Therefore, transmission configuration indicators (TCIs) of N TRPs are preferred to be configured independently, because beam directions of the PDSCHs are different for the N TRPs. To have a higher flexibility, the TCI configuration for one UE may be extended into N parts. The following shows extending the TCI configuration into 2 parts according to design 1. The solution of design 2 is also workable.

```
PDSCH-Config ::=                SEQUENCE {
    ...
    tci-StatesToAddModList      SEQUENCE  (SIZE(1..maxNrofTCI-States))   OF
TCI-State
    tci-StatesToReleaseList     SEQUENCE  (SIZE(1..maxNrofTCI-States))   OF
TCI-StateId
    tci-StatesToAddModList2             SEQUENCE (SIZE(1..maxNrofTCI-States))
OF TCI-State
    tci-StatesToReleaseList2    SEQUENCE  (SIZE(1..maxNrofTCI-States))   OF
TCI-StateId
    ...
```

Optionally, for flexibility, some other sub-parameters included in the PDSCH-Config may also be extended into N parts, such as rate matching parameters of rateMatchPatternGroup1 and rateMatchPatternGroup2. Alternatively, the PDSCH-Config may be extended into N parts directly, as shown below. For example, the original PDSCH-Config is extended into two parts, i.e., PDSCH-Config and PDSCH-Config2, which correspond to the configuration of two TRPs respectively. For different BWPs or CCs, the number of N may be different.

```
BWP-DownlinkDedicated ::=       SEQUENCE {
pdcch-Config                    SetupRelease { PDCCH-Config }
OPTIONAL,        -- Need M
    pdsch-Config                SetupRelease { PDSCH-Config }    OPTIONAL,
    -- Need M
    pdsch-Config2               SetupRelease { PDSCH-Config }    optional
    sps-Config                  SetupRelease { SPS-Config }
```

-continued

```
OPTIONAL,         -- Need M
    radioLinkMonitoringConfig SetupRelease { RadioLinkMonitoringConfig }
    OPTIONAL, --Need M
    ...
}
```

Optionally, uplink configuration parameters included in the uplink BWP or the CC may also be extended into multiple parts to increase the flexibility. For example, the PUCCH configures pucch-Config, the PUSCH configures pusch-Config, the SRS configures srs-config, etc.

In summary, in the embodiment of the present disclosure, some parameters included in a BWP configuration are extended into N parts to correspond to the transmission of N TRPs. Some parameters may be shared for N TRPs, so there is no need to be extended. The parameters included in the uplink BWP configuration (BWP-UplinkDedicated) and the parameters included in the downlink BWP configuration (BWP-DplinkDedicated) are extended independently. Different BWPs can have different N values. Further, sub-sub-parameters or the sub-parameters of some configuration parameters included in the BWP configuration may be extended, for example, a TCI configuration parameter (such as tci-StatesToAddModList), a sub-parameter of the parameter of pdsch-Config in the BWP configuration, is extended.

In addition, some configuration parameters included in a CC configuration may be extended into N parts to correspond to the N TRPs. For example, an uplink-downlink slot configuration parameter tdd-UL-DL-ConfigurationDedicated is extended into N parts. For example, the parameter of tdd-UL-DL-ConfigurationDedicated is extended into 2 parts, that is, tdd-UL-DL-ConfigurationDedicated and tdd-UL-DL-ConfigurationDedicated2 which correspond to the configuration of two TRPs respectively.

```
        ServingCellConfig ::=           SEQUENCE {
            tdd-UL-DL-ConfigurationDedicated
            TDD-UL-DL-ConfigDedicated
    OPTIONAL,-- Cond TDD
``` tdd-UL-DL-ConfigurationDedicated2 TDD-UL-DL-ConfigDedicated

Other parameters in the CC may also be extended, such as csi-MeasConfig, or sub-parameters of some configuration parameters in the CC may also be extended. For ease of operation, BWP configuration parameters in the CC may be extended into N parts. Multiple BWPs (up to 4 uplink BWPs or 4 downlink BWPs) may be included in one CC, and data of one UE can only be scheduled on one BWP at a time. Extending the BWP configuration into N parts may be understood as, in one CC, at most N BWPs may be used for data scheduling of the UE at a time. The N BWPs correspond to the BWP configuration of N TRPs respectively. The following are CC configuration parameters in related art.

```
        ServingCellConfig ::=                       SEQUENCE {
            tdd-UL-DL-ConfigurationDedicated TDD-UL-DL-ConfigDedicated
    OPTIONAL,-- Cond TDD
            initialDownlinkBWP                  BWP-DownlinkDedicated
    OPTIONAL,-- Cond ServCellAdd
            downlinkBWP-ToReleaseList SEQUENCE (SIZE (1..maxNrofBWPs)) OF
    BWP-Id OPTIONAL,  -- Need N
            downlinkBWP-ToAddModList                 SEQUENCE (SIZE
    (1..maxNrofBWPs)) OF BWP-Downlink
            firstActiveDownlinkBWP-Id              BWP-Id      OPTIONAL,--
    Cond SyncAndCellAdd
            bwp-InactivityTimer ENUMERATED { ms2, ms3, ...
            defaultDownlinkBWP-Id              BWP-Id
    OPTIONAL,  -- Need S
```

It is to be noted that after extending the BWP configuration, the number of BWP configurations may increase, for example, the maximum number of BWPs maxNrofBWPs will increase. In addition, the number of activated BWPs may be multiple, and the activated BWPs correspond to activated BWPs of the multiple TRPs. For example, firstActiveDownlinkBWP-Id or defaultDownlinkBWP-Id becomes multiple BWP-Ids. As shown below.

```
firstActiveDownlinkBWP-Id SEQUENCE (SIZE (1..N)) OF BWP-Id
    bwp-InactivityTimer ENUMERATED { ms2, ms3, ...
defaultDownlinkBWP-Id    SEQUENCE (SIZE (1..N)) OF BWP-Id
```

It is to be noted that parameters with underline herein are parameters changed based on the standards. Extending some parameters into N parts makes the protocol design clear. However, during Multi-TRPs scheduling, if there is no scheduling limitation, scheduling signals of N TRPs cause strong interference, especially on control channels.

To implement the resource orthogonalization of control channels, that is making the control channels of multiple TRPs transmit on different time-frequency resources, a CORESET (ControlResourceSet) configuration or a search space configuration in a downlink PDCCH configuration (pdcch-Config) is divided into N parts. Similarly, for the uplink, all PUCCH resource sets or PUCCH resources in a PUCCH configuration are divided into N parts.

In step S302: an association relationship of the extended or divided parameters is established, where various parameters with the association relationship belong to a same parameter group.

After extending or dividing some configuration parameters included in the CCs or the BWPs or sub-parameters of the configuration parameters included in the CCs or the BWPs into N parts, if the relationship among the N parts of parameters of different CCs or BWPs is not established, an uplink control information (UCI) feedback problem may be caused, the reasons are as follows.

Figure 4:
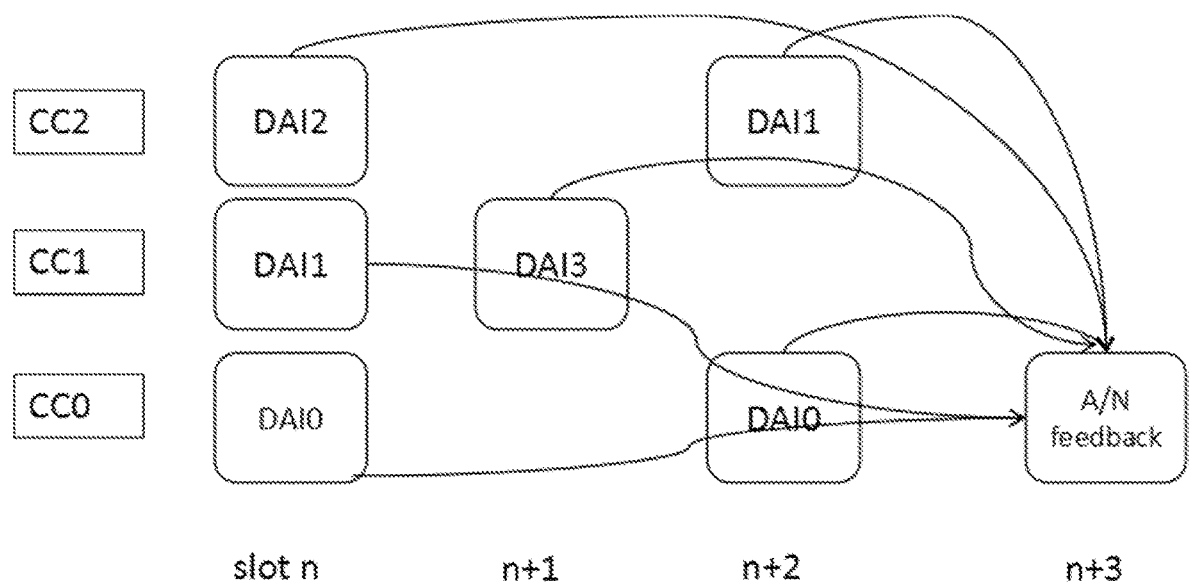
FIG. 4 is a diagram of A/N of multiple PDSCHs feeding back in a same slot in the second embodiment of the present application.

On the basis of an A/N feedback mechanism of the NR, only one PUCCH resource may be used for feeding back acknowledgement (ACK)/non-acknowledgement (NACK) in one slot. As shown in FIG. 4, a base station totally schedules 6 PDSCHs on a slot n, a slot (n+1), and a slot (n+2). Multiple PDSCHs may be transmitted on different CCs, but their A/Ns need to be fed back on the same slot (n+3). In this case, the A/Ns of the 6 PDSCHs are fed back in one PUCCH resource on the slot (n+3). And the downlink assignment index (DAI) calculation is cross-CCs and cross-slots.

As described in protocol 38.212, for the PDSCHs feeding back the A/Ns in the same slot, the DAI notified in the DCI indicates a scheduling cumulative index of PDSCH or the total number of PDSCHs. This index is cross-CCs and cross-slots. As shown in FIG. 4, the 6 PDSCH indexes scheduled from the slot n to the slot (n+2) should be 0 to 5, but since an index of the DAI only has 2 bits, a modulus needs to be taken, so DAI values of two PDSCHs on the slot (n+2) should be mod(4,4)=0 and mod(5,4)=1 respectively.

Figure 5:
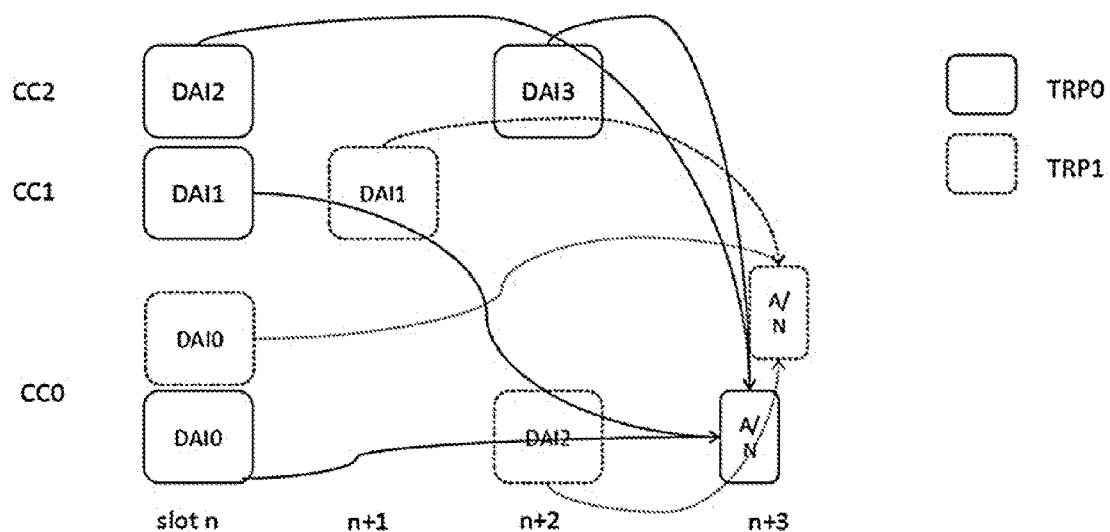
FIG. 5 is a diagram of A/N scheduled by multiple PDSCHs feeding back in a same slot in the second embodiment of the present application.

When multi-TRPs transmission is supported, the PDSCH feeding back the A/N in the same slot may be from different TRPs. Since there is no dynamic interaction between the different TRPs, the DAI values carried in the DCI transmitted by the different TRPs are mutually independent, and the DAI values carried in the DCI transmitted by a same TRP are cumulated in order, as shown in FIG. 5.

Therefore, the UE needs to know that PDSCHs transmitted on different CCs or BWPs or PDCCHs scheduling the PDSCHs come from which TRP, so that the DAI cumulative calculation may be performed on different TRPs separately. In other words, to implement Multi-TRPs scheduling, after extending or dividing some configuration parameters or sub-parameters of configuration parameters included in the CC or BWP into N parts, it is necessary to establish an association relationship among the extended or divided parameters of different CCs or BWPs.

In particular, there are two following manners for establishing the association relationship among the expanded or divided parameters.

1) A first manner: adding a group index to the parameters configured for the UE, where the parameters with a same group index having the association relationship.

Further, the parameters with the same group index on different CCs or BWPs have the association relationship.

Optionally, the group index may be represented as a group_ID, and a value of the group_ID ranges from 0 to N−1. Transmissions of the control channels or the data channels corresponding to the configuration parameters configured with the same group_ID have the association relationship.

Further, after establishing the association relationship among the expanded or divided parameters, the method further includes the step below.

A downlink allocation index (DAI) is independently indicated corresponding to each parameter group.

In the embodiment of the present disclosure, the DAI is indicated in the DCI and the PDSCH that have the association relationship. In other words, in one DCI, a value of DAI total indicates the number of PDSCHs on all CCs that have the correspondence or association relationship with the DCI. The DAI cumulative value is also a cumulative index of the number of PDSCHs that have the correspondence or association relationship, and this index is cumulated in all PDCCHs or PDSCHs that have the association relationship with the DCI. In other words, indications of the DAI work independently in their respective sets, and one set refers to the PDSCH or the PDCCH that have the association relationship on all CCs. As shown in FIG. 5, there are 7 PDSCHs on all CCs that need to feed back A/N on slot (n+3). According to different group IDs, the PDSCHs may be divided into two sets. The PDSCHs in set 0 (represented as solid squares) are transmitted by the TRP0, and the PDSCHs of set 1 (represented as dashed squares) are transmitted by the TRP1. In the set 0, cumulative values of DAI in the DCI corresponding to 4 PDSCHs are 0, 1, 2 and 3 respectively, so the DAI total should be 4 (i.e., 4); and in the set 1, the cumulative values of DAI in the DCI corresponding to 3 PDSCHs are 0, 1 and 2 respectively, and the DAI total should be 3 (i.e., 3). The UE determines whether there is a miss detection according to the DAI values in the set. Therefore, DAIs in different sets have no dependency relationship. In this case, the group_ID may be configured on the configuration parameters of the PDCCHs or on the configuration parameters of the PDSCHs. If the group_ID is configured on the configuration parameters of the PDCCHs, then PDSCHs scheduled by the PDCCHs having the association relationship also have the associated relationship; and if the group_ID is configured on the configuration parameters of the PDSCHs, then PDCCHs scheduling the PDSCHs having the association relationship also have the association relationship.

In addition, the effect of dividing the configuration parameters in step S301 can be achieved by the configured group_ID. For example, the CORESET (ControlResourceSet) configuration or the search space configuration in the downlink PDCCH configuration (pdcch-Config) is divided into N parts. Alternatively, all PUCCH resource sets or PUCCH resources in the PUCCH configuration are divided into N parts. For example, multiple CORESETs or different search spaces configured for the UE may be divided into 2 parts according to the configured group_ID, as shown below. After the division, different TRPs use different control channels, thus the orthogonalization of multiple TRP control channels is achieved.

```
ControlResourceSet ::=            SEQUENCE {
       controlResourceSetId
ControlResourceSetId,
       group_ID
INTEGER{0,1}
    frequencyDomainResources       BIT STRING (SIZE
(45)),
       duration    INTEGER (1..maxCoReSetDuration),
OPTIONAL,  -- Need S
    ...
}
Search Space ::=                   SEQUENCE {
    group_ID                       INTEGER{0,1}
```

```
        searchSpaceId                        SearchSpaceId,
        controlResourceSetId        ControlResourceSetId    OPTIONAL,
    -- Cond SetupOnly
        monitoringSlotPeriodicityAndOffset   CHOICE {
    An example of one group_ID is configured in the PDSCH-Config or the PDCCH-Config is
shown below.
    PDSCH-Config ::=                         SEQUENCE {
        group_ID                             INTEGER{0,1}
        ...
        tci-StatesToAddModList      SEQUENCE  (SIZE(1..maxNrofTCI-States))   OF
TCI-State
        tci-StatesToReleaseList     SEQUENCE  (SIZE(1..maxNrofTCI-States))   OF
TCI-StateId
        ...
    PDCCH-Config ::=                         SEQUENCE {
        group_ID                             INTEGER{0,1}
        controlResourceSetToAddModList   SEQUENCE(SIZE    (1..3))            OF
ControlResourceSet
        controlResourceSetToReleaseList  SEQUENCE(SIZE    (1..3))            OF
ControlResourceSetId
        ...
    Configuration for the PUCCH is shown below.
    PUCCH-Config ::=                         SEQUENCE {
        group_ID                             INTEGER{0,1}
        resourceSetToAddModList              SEQUENCE  (SIZE
(1..maxNrofPUCCH-ResourceSets)) OF PUCCH-ResourceSet
        OPTIONAL,-- Need N
        resourceSetToReleaseList             SEQUENCE         (SIZE
(1..maxNrofPUCCH-ResourceSets)) OF PUCCH-ResourceSetId
        OPTIONAL,-- Need N
```

Similarly, different CCs or BWPs may be divided into N parts, that is, one group_ID is configured in the CC or BMP.

```
    ServingCellConfig ::=                    SEQUENCE {
        group_ID                             INTEGER{0,1}
        tdd-UL-DL-ConfigurationDedicated  TDD-UL-DL-ConfigDedicated
OPTIONAL,-- Cond TDD
        initialDownlinkBWP          BWP-DownlinkDedicated
OPTIONAL,-- Cond ServCellAdd
        downlinkBWP-ToReleaseList SEQUENCE (SIZE (1..maxNrofBWPs)) OF
BWP-Id
OPTIONAL,   -- Need N
        downlinkBWP-ToAddModList           SEQUENCE (SIZE
(1..maxNrofBWPs)) OF BWP-Downlink    or
    BWP-UplinkDedicated ::=                  SEQUENCE {
        group_ID                             INTEGER{0,1}
        pucch-Config                SetupRelease { PUCCH-Config }
OPTIONAL,   -- Need M
        pusch-Config                SetupRelease { PUSCH-Config }  OPTIONAL,
    -- Cond SetupOnly
        configuredGrantConfig       SetupRelease { ConfiguredGrantConfig }
OPTIONAL,  -- Need M
        srs-Config         SetupRelease { SRS-Config }
        OPTIONAL,   -- Need M
        beamFailureRecoveryConfig SetupRelease { BeamFailureRecoveryConfig }
OPTIONAL,   --CondSpCellOnly
        ...
    }
    BWP-DownlinkDedicated ::=                SEQUENCE {
        group_ID                             INTEGER{0,1}
        pdcch-Config       SetupRelease { PDCCH-Config }
OPTIONAL,-- Need M
        pdsch-Config       SetupRelease { PDSCH-Config }
OPTIONAL,-- Need M
        sps-Config         SetupRelease { SPS-Config }
OPTIONAL,   -- Need M
        radioLinkMonitoringConfig     SetupRelease
{ RadioLinkMonitoringConfig } OPTIONAL,-- Need M
        ...
    }
```

Furthermore, after adding the group index to the parameters configured for the UE, the method further includes: establishing a correspondence between the group index of each parameter group and a scrambling identifier (ID) configured by higher layer signaling.

In addition, the scrambling ID configured through the higher layer signaling corresponds to a cell ID; the scrambling ID configured through the higher layer signaling corresponds to a scrambling ID of a demodulation reference signal.

For example, if N=2, and the higher layer configures scrambling IDs of two demodulation reference signals (DMRSs), group_ID=0 and group_ID=1 may correspond to $N\_ID^\wedge 0, N\_ID^\wedge 1 \in \{0, 1, \ldots, 65535\}$ respectively, or scramblingID0 and scramblingID1 respectively. This is because the scrambling IDs of the DMRSs may also implicitly correspond to different cell IDs.

In the embodiment of the present disclosure, the association relationship of different configuration parameters may be established according to the group index, that is, the configuration parameters with a same group index have association relationship. It can be understood that different configuration parameters with the association relationship are used for the same TRP. After the UE obtains N parameter groups, configuration parameters of resources (the PDSCH, the PUSCH, the PUCCH, the SRS, etc.) scheduled by the control channel (PDCCH) configuration parameters are derived from the data channel configuration parameters associated with the control channel parameters. For example, an actual value indicated by a time domain resource assignment in one DCI depends on the higher layer parameter pdsch-AllocationList. If the DCI corresponds to the group_ID 0, then the pdsch-AllocationList also needs to correspond to the group_ID 0. In other words, the group IDs configured in the pdcch-Config corresponding to the DCI and the pdsch-Config corresponding to the pdsch-AllocationList should be the same.

2) A second manner: an n-th configuration parameter x in BWP_i has the association relationship with an n-th configuration parameter y in BWP_j, where i, j, and n are all positive integers, and 1≤n≤N.

BWP_i and BWP_j may belong to a same CC or different CCs, and the configuration parameter x and the configuration parameter y are same or different configuration parameters.

It can also be that an n-th configuration parameter x in CC_i has the association relationship with an n-th configuration parameter y in CC_j.

It should be noted that if there is no n-th configuration parameter on CC_j or BWP_j, the n-th configuration parameters on CC_i or BWP_i does not correspond to the configuration parameters on CC_j or BWP_j.

An example is shown below.

As shown below, first configuration parameters on the CC0 (including pdcch-Config and pdsch-Config) correspond to first configuration parameters on the CC1 and the CC2; second configuration parameters on the CC0 (including pdcch-Config2 and Pdsch-Config2) correspond to the second configuration parameters on the CC1. Since there is no expanded second configuration parameter on the CC2, the second configuration parameters on the CC0 do not correspond to the configuration parameter on the CC2.

For different configuration parameters on the same BWP or CC, the number of the parts of extended configuration parameters should be equal and correspond in order. For example, the pdcch-config corresponds to the pdsch-config, and the pdcch-config2 corresponds to the pdsch-config2.

```
CC0:
    BWP-DownlinkDedicated ::=        SEQUENCE {
        pdcch-Config                  SetupRelease { PDCCH-Config }
    OPTIONAL,-- Need M
        pdcch-Config2                 SetupRelease { PDCCH-Config }
        pdsch-Config                  SetupRelease { PDSCH-Config }
        pdsch-Config2                 SetupRelease { PDSCH-Config }   optional
    OPTIONAL,-- Need M
        sps-Config                    SetupRelease { SPS-Config }
    OPTIONAL, -- Need M
        radioLinkMonitoringConfig  SetupRelease { RadioLinkMonitoringConfig }
    OPTIONAL,-- Need M
        ...
    }
CC1:
        pdcch-Config                  SetupRelease { PDCCH-Config }
    OPTIONAL,-- Need M
        pdcch-Config2                 SetupRelease { PDCCH-Config }
        pdsch-Config                  SetupRelease { PDSCH-Config }
        pdsch-Config2                 SetupRelease { PDSCH-Config }   optional
    OPTIONAL,-- Need M
        sps-Config        SetupRelease { SPS-Config }
    OPTIONAL, -- Need M
        radioLinkMonitoringConfig  SetupRelease { RadioLinkMonitoringConfig }
    OPTIONAL,-- Need M
        ...
    }
CC2:
    BWP-DownlinkDedicated ::=        SEQUENCE {
        pdcch-Config                  SetupRelease { PDCCH-Config }
    OPTIONAL,-- Need M
        pdsch-Config                  SetupRelease { PDSCH-Config }
    OPTIONAL,-- Need M
        sps-Config                    SetupRelease { SPS-Config }
```

-continued

```
OPTIONAL,  -- Need M
    radioLinkMonitoringConfig  SetupRelease
{ RadioLinkMonitoringConfig }   OPTIONAL,-- Need M
    ...
  }
```

In step S303, information of the parameter group is transmitted to the UE.

In particular, the method further includes: allocating a search space or an uplink transmission corresponding to different parameter groups to different time units.

The time unit is a slot or a time domain symbol. The uplink transmission is used for feeding back uplink control information (UCI).

Optionally, the uplink transmission refers to one or more of the PUCCH, PUSCH and SRS.

If multiple TRPs allocate uplink data transmissions to one UE in a same time unit, and there is no dynamic interaction among these TRPs, then it is likely that the UE does not have enough power to transmit all the uplink data. Therefore, the TRPs may perform semi-statically negotiation, and then allocate the uplink transmission scheduled by different TRPs in different time units. Generally, the uplink transmission includes the transmission of the PUSCH, the transmission of the PUCCH, and the transmission of the SRS, etc. In addition, for downlink control channels, the search space with different correspondences may also be transmitted in different time units, so that PDCCHs from different TRPs are orthogonalized in the time domain, thereby avoiding interference among the PDCCHs. For example, as shown in FIG. 6, the TRP0 feeds back the UCI through slot (n+3), and the TRP1 feeds back the UCI through slot (n+4). Generally, the UCI is transmitted on the PUCCH, therefore, there is a further limitation that only the PUCCHs with no association relationship are allocated to different time units, and this limitation is not applicable to the PUSCHs and the SRSs.

In addition, in a case where there are multiple uplink transmission resources in one time unit, for example, multiple PUCCH resources are used for transmitting CSI or ACK/NACK, etc. The UE generally needs to combine these multiple uplink transmission resources, and then transmits the combined uplink information on one of the multiple uplink transmission resources. For the uplink transmission of multiple parameter groups, one manner is to combine information of multiple uplink transmission resources (data on PUSCH, CSI, ACK/NACK, etc.) within the parameter groups respectively, that is, the uplink transmission resources of different parameter groups cannot be combined. Then in their respective groups, the combined uplink information is transmitted on one of the multiple uplink transmission resources configured in the group. Optionally, information of the uplink transmission resources of the parameter group with a lower priority may be discarded in an order of priority. For example, the larger the group_ID is, the lower the priority is. For example, in a time unit, the UE needs to transmit the PUCCH0, the PUSCH0, the PUCCH1, and the PUSCH1, and the PUCCH0 and the PUSCH0 have the association relationship, the PUCCH1 and the PUSCH1 have the association relationship, and the PUCCH0/PUSCH0 and the PUCCH1/PUSCH1 belong to different parameter groups. After the combination, information on the PUCCH0 and the PUSCH0 is transmitted on the PUSCH0, and information on the PUCCH1 and the PUSCH1 is transmitted on the PUSCH1. Optionally, a priority rule may be defined to discard the PUSCH1. This may ensure that enough power is provided on the PUSCH0 for transmission.

Further, since there is no power limitation on the downlink data transmission, the PDSCHs transmitted by multiple TRPs may exist on the same time unit. For the number of codewords (CWs), scheduling of one PDSCH supports up to two CWs, that is, the maximum number of CWs may be 1 or 2, which may be configured by the higher layer signaling. In other words, the ability of the UE is to support up to two CWs in one BWP.

In a case where multiple TPRs scheduling is supported, in order not to increase the complexity of the UE, in one CC or one BWP, when the PDSCH or the PUSCH corresponding to different parameter groups overlap in the time domain, the number of codewords in each PDSCH or PUSCH is limited to M. In one embodiment, M=1. Such limitation reduces the total number of CWs received by the UE, thereby reducing the complexity of the UE. In a case where the PUSCHs or the PDSCHs corresponding to different parameter groups do not overlap in the time domain, the number of CWs M in each PDSCH is configured by the higher layer signaling. Overlapping in the time domain refers to on the same slot or the same time domain symbol.

Further, within one CC or one BWP, one or more the following configuration parameters in the PDSCH, the PUSCH, or the PDCCH corresponding to different parameter groups are different: a hybrid automatic repeat request (HARD) processing number, or a demodulation reference signal port.

It is to be noted that when the PDSCHs scheduled by multiple TRPs overlap in the time domain and the frequency domain which are mostly used for multiple-input multiple-output (MIMO) transmission, in this case, DMRS ports of the PDSCHs with different association relationships are required to be different, so the DMRSs are orthogonal. In this case, there is no strong interference among the TRPs. In other words, when the PDSCHs/PUSCHs of different parameter groups overlap in the time domain and the frequency domain, the DMRS ports are different. If there is no overlap, there is no limitation to whether the DMRS ports are different. In a case where the demodulation reference signal ports for the PDSCH or PUSCH corresponding to different parameter groups are different, time-frequency domain resources for the PUSCH or the PDSCH corresponding to the different parameter groups are overlapped.

In addition, in order to reduce the complexity of hybrid automatic repeat request (HARQ) processing, it may be specified that HARQ processing numbers of the corresponding PDCCH, the PUSCH or the PDSCH with different association relationships are different. Optionally, the base station may divide the HARQ processing numbers into N sets through the higher layer signaling, and candidate values of the HARQ processing numbers corresponding to the PDSCH or PDCCH having different association relationships are different.

Furthermore, various parameters in different parameter groups correspond to different media access control (MAC) control elements.

A third embodiment of the present disclosure provides an information receiving method. As shown in FIG. 7, the method includes steps described below.

In step S701, information of a parameter group configured for a user equipment (UE) and an association relationship among parameters configured for the UE are received, where various parameters with the association relationship belong to a same parameter group.

The parameters configured for the UE include at least one of: multiple component carriers (CCs), multiple bandwidth parts (BWPs), configuration parameters in one or more CCs or sub-parameters of the configuration parameters in one or more CCs, or configuration parameters in one or more BWPs or sub-parameters of the configuration parameters in one or more BWPs.

In particular, before receiving the association relationship among the parameters configured for the UE, the method further includes: expanding or dividing, by a transmission end, the configuration parameters in one or more BWPs configured for the UE or sub-parameters of the configuration parameters in one or more BWPs configured for the UE into N parts.

Optionally, the step of expanding or dividing, by a transmission end, the configuration parameters in one or more BWPs configured for the UE or sub-parameters of the configuration parameters in one or more BWPs configured for the UE into N parts includes: expanding or dividing configuration parameters in an uplink BWP and/or a downlink BWP or sub-parameters of the configuration parameters in the uplink BWP and/or the downlink BWP into N parts.

The configuration parameters in the uplink BWP include at least one of: configuration parameters of a physical uplink control channel (PUCCH), configuration parameters of a physical uplink shared channel (PUSCH), or configuration parameters of a channel sounding reference signal (SRS).

The configuration parameters in the downlink BWP include at least one of: configuration parameters of a physical downlink control channel (PDCCH) or configuration parameters of a physical downlink shared channel (PDSCH).

Further, receiving the association relationship among the parameters configured for the UE includes: adding, by a transmission end, a group index to the parameters configured for the UE, where the parameters with a same group index have the association relationship.

Optionally, the parameters with the same group index on different CCs or BWPs have the association relationship.

Optionally, receiving the association relationship among the parameters configured for the UE further includes: an n-th configuration parameter x in BWP_i has an association relationship with an n-th configuration parameter y in BWP_j, where i, j, and n are all positive integers, and 1≤n≤N.

BWP_i and BWP_j belong to a same CC or different CCs, and the configuration parameter x and the configuration parameter y are same or different configuration parameters.

It is to be noted that the parameters in different parameter groups are used for data transmission of different TRPs.

Further, after adding the group index to the parameters configured for the UE, the method further includes: establishing, by a base station, a correspondence between the group index of each parameter group and a scrambling identifier (ID) configured by higher layer signaling.

The scrambling ID configured through the higher layer signaling corresponds to a cell ID.

The scrambling ID configured through the higher layer signaling corresponds to a scrambling ID of a demodulation reference signal.

The method further includes: allocating, by the base station, a search space or an uplink transmission corresponding to different parameter groups to different time units.

The time unit is a slot or a time domain symbol.

The uplink transmission is used for feeding back uplink control information (UCI).

Further, within one CC or one BWP, one or more the following configuration parameters in the PDSCH, the PUSCH, or the PDCCH corresponding to different parameter groups are different: a hybrid automatic repeat request (HARM) processing number, or a demodulation reference signal port.

In a case where demodulation reference signal ports for the PDSCH or PUSCH corresponding to different parameter groups are different, time-frequency domain resources for the PUSCH or the PDSCH corresponding to the different parameter groups are overlapped.

The method further includes: calculating, by the UE, a downlink allocation index (DAI) corresponding to each parameter group.

Further, within one CC or one BWP, in a case where physical uplink shared channels (PUSCHs) or physical downlink shared channels (PDSCHs) corresponding to different parameter groups overlap in a time domain, the number of codewords (CWs) in each PDSCH or PUSCH is limited to M.

Preferably, M=1.

In a case where the PUSCHs or the PDSCHs corresponding to different parameter groups do not overlap in the time domain, the number of CWs M in each PDSCH is configured by higher layer signaling.

Furthermore, various parameters in different parameter groups correspond to different media access control (MAC) control elements.

In a fourth embodiment of the present disclosure provides an information transmission apparatus. As shown in FIG. 8, the apparatus includes the following components: an association module 801 and a transmission module 802.

The association module 801 is used for establishing an association relationship among parameters configured for a user equipment (UE), where multiple parameters having the association relationship belong to a same parameter group.

The parameters configured for the UE include at least one of: multiple component carriers (CCs), multiple bandwidth parts (BWPs), configuration parameters in one or more CCs or sub-parameters of the configuration parameters in the one or more CCs, or configuration parameters in one or more BWPs or sub-parameters of the configuration parameters the in one or more BWPs.

The transmission module 802 is used for transmitting information of the parameter group to the UE.

Specifically, the apparatus further includes: an extension module, which is used for extending or dividing, before establishing the association relationship among parameters configured for the UE, the configuration parameters in one or more BWPs configured for the UE or the sub-parameters of the configuration parameters in the one or more BWPs configured for the UE into N parts.

Optionally, the extension module is particularly used for: extending or dividing the configuration parameters in an uplink BWP and/or a downlink BWP or sub-parameters of the configuration parameters in the uplink BWP and/or the downlink BWP into N parts.

The configuration parameters in the uplink BWP include at least one of: configuration parameters of a physical uplink control channel (PUCCH), configuration parameters of a physical uplink shared channel (PUSCH), or configuration parameters of a channel sounding reference signal (SRS).

The configuration parameters in the downlink BWP include at least one of: configuration parameters of a physical downlink control channel (PDCCH) or configuration parameters of a physical downlink shared channel (PDSCH).

Further, the association module 801 is particularly used for: adding a group index to the parameters configured for the UE, where the parameters with a same group index have the association relationship.

The parameters with the same group index on different CCs or BWPs have the association relationship.

Optionally, the association module 801 is further used for configuring that: an n-th configuration parameter x in BWP_i has an association relationship with an n-th configuration parameter y in BWP_j, where i, j, and n are all positive integers, and $1 \leq n \leq N$.

BWP_i and BWP_j belong to a same CC or different CCs, and the configuration parameter x and the configuration parameter y are same or different configuration parameters.

It is to be noted that the parameters in different parameter groups are used for data transmission of different TRPs.

Further, the association module 801 is further used for: establishing a correspondence between the group index of each parameter group and a scrambling identifier (ID) configured by higher layer signaling.

The scrambling ID configured through the higher layer signaling corresponds to a cell ID; or the scrambling ID configured through the higher layer signaling corresponds to a scrambling ID of a demodulation reference signal.

Further, the apparatus further includes: an allocation module, which is used for allocating a search space or an uplink transmission corresponding to different parameter groups to different time units.

The time unit is a slot or a time domain symbol. The uplink transmission is used for feeding back uplink control information (UCI).

Further, within one CC or one BWP, one or more the following configuration parameters in the PDSCH, the PUSCH, or the PDCCH corresponding to different parameter groups are different: a hybrid automatic repeat request (HARD) processing number, or a demodulation reference signal port.

In a case where demodulation reference signal ports for the PDSCH or PUSCH corresponding to different parameter groups are different, time-frequency domain resources for the PUSCH or the PDSCH corresponding to the different parameter groups are overlapped.

Further, the apparatus further includes: an indication module, which is used for independently indicating a downlink allocation index (DAI) corresponding to each parameter group.

Further, within one CC or one BWP, in a case where physical uplink shared channels (PUSCHs) or physical downlink shared channels (PDSCHs) corresponding to different parameter groups overlap in a time domain, the number of codewords (CWs) in each PDSCH or PUSCH is limited to M.

Preferably, M=1.

In a case where the PUSCHs or the PDSCHs corresponding to different parameter groups do not overlap in the time domain, the number of CWs M in each PDSCH is configured by higher layer signaling.

Furthermore, various parameters in different parameter groups correspond to different media access control (MAC) control elements.

Figure 9:
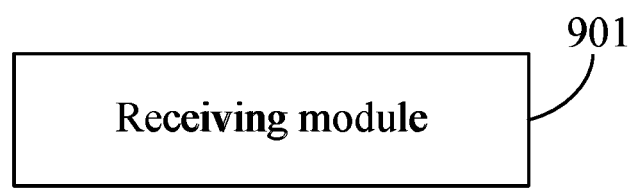
FIG. 9 is a structure diagram of an information receiving apparatus in a fifth embodiment of the present application.

A fifth embodiment of the present disclosure provides an information receiving apparatus. As shown in FIG. 9, the apparatus particularly includes a receiving module 901, which is used for receiving information of a parameter group configured for a user equipment (UE) and an association relationship among parameters configured for the UE, where various parameters with the association relationship belong to a same parameter group.

The parameters configured for the UE include at least one of: multiple component carriers (CCs), multiple bandwidth parts (BWPs), configuration parameters in one or more CCs or sub-parameters of the configuration parameters in the one or more CCs, or configuration parameters in one or more BWPs or sub-parameters of the configuration parameters in the one or more BWPs.

Particularly, a transmission end extends or divides the configuration parameters in one or more BWPs configured for the UE or sub-parameters of the configuration parameters in the one or more BWPs configured for the UE into N parts.

Optionally, the transmission end extends or divides the configuration parameters in an uplink BWP and/or a downlink BWP or sub-parameters of the configuration parameters in the uplink BWP and/or the downlink BWP into N parts.

The configuration parameters in the uplink BWP include at least one of: configuration parameters of a physical uplink control channel (PUCCH), configuration parameters of a physical uplink shared channel (PUSCH), or configuration parameters of a channel sounding reference signal (SRS).

The configuration parameters in the downlink BWP include at least one of: configuration parameters of a physical downlink control channel (PDCCH) or configuration parameters of a physical downlink shared channel (PDSCH).

Further, receiving the association relationship among the parameters configured for the UE includes: adding, by a transmission end, a group index to the parameters configured for the UE, where the parameters with a same group index have the association relationship.

Optionally, the parameters with the same group index on different CCs or BWPs have the association relationship.

Optionally, receiving the association relationship among the parameters configured for the UE further includes: an n-th configuration parameter x in BWP_i has an association relationship with an n-th configuration parameter y in BWP_j, where i, j, and n are all positive integers, and $1 \leq n \leq N$.

BWP_i and BWP_j belong to a same CC or different CCs, and the configuration parameter x and the configuration parameter y are same or different configuration parameters.

It is to be noted that the parameters in different parameter groups are used for data transmission of different TRPs.

Further, a correspondence between the group index of each parameter group and a scrambling identifier (ID) configured by higher layer signaling is established by a base station.

The scrambling ID configured through the higher layer signaling corresponds to a cell ID; or the scrambling ID configured through the higher layer signaling corresponds to a scrambling ID of a demodulation reference signal.

Further, the base station allocates a search space or an uplink transmission corresponding to different parameter groups to different time units.

Optionally, the time unit is a slot or a time domain symbol. The uplink transmission is used for feeding back uplink control information (UCI).

Further, within one CC or one BWP, one or more the following configuration parameters in the PDSCH, the PUSCH, or the PDCCH corresponding to different parameter groups are different: a hybrid automatic repeat request (HARD) processing number, or a demodulation reference signal port.

In a case where demodulation reference signal ports for the PDSCH or PUSCH corresponding to different parameter groups are different, time-frequency domain resources for the PUSCH or the PDSCH corresponding to the different parameter groups are overlapped.

Further, the UE calculates a downlink allocation index (DAI) corresponding to each parameter group.

Further, within one CC or one BWP, in a case where physical uplink shared channels (PUSCHs) or physical downlink shared channels (PDSCHs) corresponding to different parameter groups overlap in a time domain, the number of codewords (CWs) in each PDSCH or PUSCH is limited to M.

Optionally, M=1.

In a case where the PUSCHs or the PDSCHs corresponding to different parameter groups do not overlap in the time domain, the number of CWs M in each PDSCH is configured by higher layer signaling.

Further, various parameters in different parameter groups correspond to different media access control (MAC) control elements.

Figure 10:
FIG. 10 is a structure diagram of an information transmission or receiving device in a sixth and seventh embodiments of the present application.

A sixth embodiment of the present disclosure provides an information transmission device. As shown in FIG. 10, the device includes a processor 1001, a memory 1002, and a communication bus.

The communication bus is configured to implement a connection communication between the processor 1001 and the memory 1002.

The processor 1001 is configured to execute an information transmission program stored in the memory 1002 to implement the following steps: establishing an association relationship among parameters configured for a user equipment (UE), where various parameters with the association relationship belong to a same parameter group; where the parameters configured for the UE include at least one of: multiple component carriers (CCs), multiple bandwidth parts (BWPs), configuration parameters in one or more CCs or sub-parameters of the configuration parameters in the one or more CCs, or configuration parameters of one or more BWPs or sub-parameters of the configuration parameters of the one or more BWPs; and transmitting information of the parameter group to the UE.

A seventh embodiment of the present disclosure provides an information receiving device. As shown in FIG. 10, the device includes a processor 1001, a memory 1002 and a communication bus. The communication bus is configured to implement a connection communication between the processor 1001 and the memory 1002. The processor 1001 is configured to execute an information receiving program stored in the memory 1002 to implement the following steps: receiving information of a parameter group configured for a user equipment (UE) and an association relationship among parameters configured for the UE, where various parameters with the association relationship belong to a same parameter group; where parameters configured for the UE include at least one of: multiple component carriers (CCs), multiple bandwidth parts (BWPs), configuration parameters in one or more CCs or sub-parameters of the configuration parameters in the one or more CCs, or configuration parameters of one or more BWPs or sub-parameters of the configuration parameters of the one or more BWPs.

An eighth embodiment of the present disclosure provides a computer-readable storage medium stored with an information transmission program; in a case where the information transmission program is executed by at least one processor, the at least one processor is caused to execute the following steps: establishing an association relationship among parameters configured for a user equipment (UE), where various parameters with the association relationship belong to a same parameter group; where the parameters configured for the UE include at least one of: multiple component carriers (CCs), multiple bandwidth parts (BWPs), configuration parameters in one or more CCs or sub-parameters of the configuration parameters in the one or more CCs, or configuration parameters of one or more BWPs or sub-parameters of the configuration parameters of the one or more BWPs; and transmitting information of the parameter group to the UE.

A ninth embodiment of the present disclosure provides a computer-readable storage medium stored with an information receiving program; in a case where the information receiving program is executed by at least one processor, the at least one processor is caused to execute the following steps: receiving information of a parameter group configured for a user equipment (UE) and an association relationship among parameters configured for the UE, where various parameters with the association relationship belong to a same parameter group; where parameters configured for the UE include at least one of: multiple component carriers (CCs), multiple bandwidth parts (BWPs), configuration parameters in one or more CCs or sub-parameters of the configuration parameters in the one or more CCs, or configuration parameters of one or more BWPs or sub-parameters of the configuration parameters of the one or more BWPs.

A tenth embodiment of the present disclosure provides a multi-point transmission method. The method particularly includes: configuring multiple physical uplink shared channels (PUSCHs) or multiple physical downlink shared channels (PDSCHs) scheduled by multiple pieces of downlink control information (DCI) in one bandwidth part (BWP) or component carrier (CC) to have a same transmission block (TB).

Particularly, in a same slot or in multiple adjacent slots, a value of an HARQ processing number of in each DCI is same.

Redundancy versions (RVs) in each DCI are different.

Further, a user equipment (UE) feeds back an A/N for the multiple PDSCHs.

The fed back A/N is obtained by performing a logical 'OR' on A/N values corresponding to the multiple PDSCHs.

The embodiment of the present disclosure is applicable to a manner in which multiple pieces of DCI are used for scheduling the PDSCHs separately in a case where there is an ideal backhaul between the multiple TRPs. In one BWP or CC, to increase the transmission accuracy of downlink data, the PDSCHs scheduled by the multiple TRPs may be repeated TBs. In this case, the HARQ processing number carried in the multiple pieces of DCI may be configured to be a same value (in a same slot or in several adjacent slots), so that the UE may aware that the TBs carried by the multiple pieces of DCI are the same. To further increase the decoding accuracy, redundancy versions (RVs) configured in the multiple pieces of DCI should be different, and the UE may combine the PDSCHs transmitted by the multiple TRPs when demodulating the data. Since the multiple PDSCHs scheduled by the TRPs through an independent DCI correspond to same TBs, the UE only needs to feed back one A/N for these PDSCHs. Alternatively, it may feed back a ACK as long as one demodulation pair in the multiple PDSCHs is demodulated correctly, so that the multiple PDSCHs needs to perform the logical 'OR' operation on the fed back ACK/NACK to form an A/N bit. For example, if the PDSCH transmitted by the TRP0 is detected by the UE correctly, it is a ACK (which is represented by 1); and the PDSCH transmitted by the TRP1 is detected by the UE incorrectly, it is an NACK (which is represented by 0), and the UE performs an 'OR' operation on the ACK and NACK during feedback, i.e., 1 or 0=1, namely, ACK. So the UE only needs to feed back 1 bit ACK.

In different BWPs or CCs, to increase the transmission accuracy of downlink data, the PDSCHs scheduled by the multiple pieces of DCI may be repeated TBs. In this case, additional signaling or rules are needed to inform users of the PDSCHs scheduled by the DCI different BWPs/CCs being same TBs, and then the UE may perform a redundancy version combination or perform an ACK/NACK feedback combination during detection.

Optionally, it is to be noted that in a same BWP/CC (and in a same slot or several adjacent slots), the TBs scheduled by the PDCCHs or PDSCHs with different correspondence relationships (i.e., from different TRPs) are same TBs. Such method may also be applied to a scenario where a single TRP transmits the multiple pieces of DCI. In short, the PDSCHs scheduled by the multiple pieces of DCI correspond to same TBs, and the UE only needs to feed back one A/N for these PDSCHs. Further, an 'OR' operation is performed on these A/Ns.

Optionally, a base station may use one piece of DCI to schedule two TBs, i.e., corresponding to two CWs, and the two TBs are same TBs. Since the DCI may configure different RVs for the two TBs, which will bring combined gains of the redundancy versions, thereby increasing the transmission accuracy of the downlink data.

In short, the above method transmits the same TBs multiple times in an initial transmission to increase the transmission accuracy, and avoids retransmissions, thereby reducing the transmission latency.

An eleventh embodiment of the present disclosure provides a multi-point transmission apparatus, and the apparatus is used for:

configuring multiple physical uplink shared channels (PUSCHs) or multiple physical downlink shared channels (PDSCHs) scheduled by multiple downlink control information (DCI) in one bandwidth part (BWP) or carrier (CC) to have a same transmission block (TB).

Particularly, in a same slot or in multiple adjacent slots, a value of an HARQ processing number in each DCI is same.

Redundancy versions (RVs) in each DCI are different.

Further, a user equipment (UE) feeds back an A/N for the multiple PDSCHs.

The fed back A/N is obtained by performing a logical 'OR' on A/N values corresponding to the multiple PDSCHs.

A twelve embodiment of the present disclosure provides a multi-point transmission device, and the device includes:
a processor, a memory and a communication bus. The communication bus is configured to implement a connection communication between the processor and the memory. The processor is configured to execute a multi-point transmission program stored in the memory to implement the following steps: configuring multiple physical uplink shared channels (PUSCHs) or multiple physical downlink shared channels (PDSCHs) scheduled by multiple pieces of downlink control information (DCI) in one bandwidth part (BWP) or component carrier (CC) to have a same transmission block (TB).

A thirteenth embodiment of the present disclosure provides a computer-readable storage medium stored with a multi-point transmission program which; when executed by at least one processor, causes the at least one processor to perform the following steps: configuring multiple physical uplink shared channels (PUSCHs) or multiple physical downlink shared channels (PDSCHs) scheduled by multiple pieces of downlink control information (DCI) in one bandwidth part (BWP) or component carrier (CC) to have a same transmission block (TB).

It will be understood by those skilled in the art that all or part of the steps in the methods described above may be implemented by related hardware instructed by a program, and the program may be stored in a computer-readable storage medium such as a read-only memory, a magnetic disk or an optical disk. Optionally, all or part of the steps in the embodiments described above may also be implemented by one or more integrated circuits. Correspondingly, each module/unit in the above embodiments may be implemented by hardware or a software functional module. The present application is not limited to any specific combination of hardware and software.

The present application may have other various embodiments. Corresponding changes and modifications may be made by those skilled in the art according to the present application without departing from the spirit and essence of the present application. However, these corresponding changes and modifications fall within the scope of the claims in the present application.

What is claimed is:
1. An information transmission method, comprising:
establishing an association relationship among a plurality of parameters associated with multiple component carriers configured for a user equipment (UE),
wherein the plurality of parameters associated with the multiple component carriers comprise configuration parameters of a physical downlink control channel (PDCCH), the PDCCH including an indication of a control resource set (CORESET),
wherein the plurality of parameters associated with the multiple component carriers corresponding to the same indication of the CORESET belong to a first parameter group of a plurality of parameter groups,
wherein the indication of the CORESET includes a group index,
wherein, within one bandwidth part (BWP), demodulation reference signal (DMRS) ports for a physical downlink shared channel (PDSCH) are different for different parameter groups of the plurality of parameter groups that are associated with the one BWP, and
wherein time-frequency domain resources for the PDSCH corresponding to the different parameter groups overlap with each other; and
transmitting information of the different parameter groups to the UE.

2. The method of claim 1, further comprising independently indicating a downlink allocation index corresponding to each parameter group.

3. The method of claim 1, wherein parameters in the different parameter groups correspond to different media access control (MAC) control elements.

4. The information transmission method of claim 1, further comprising:
dividing a set of parameters for the UE into a plurality of subsets of parameters, a subset of the plurality of subsets of parameters being the plurality of parameters associated with the multiple component carriers configured for the UE.

5. An information reception method, comprising:
receiving information of a plurality of parameter groups configured for a user equipment (UE) and an association relationship among a plurality of parameters associated with multiple component carriers configured for the UE;
wherein the plurality of parameters associated with the multiple component carriers comprise configuration parameters of a physical downlink control channel (PDCCH), the PDCCH including an indication of a control resource set (CORESET);
wherein the plurality of parameters associated with the multiple component carriers corresponding to the same indication of the CORESET belong to a first parameter group of the plurality of parameter groups,
wherein the indication of the CORESET includes a group index,
wherein, within one bandwidth part (BWP), demodulation reference signal (DMRS) ports for a physical downlink shared channel (PDSCH) are different for different parameter groups of the plurality of parameter groups that are associated with the one BWP; and
wherein time-frequency domain resources for the PDSCH corresponding to the different parameter groups overlap with each other.

6. The method of claim 5, further comprising determining a downlink allocation index (DAI) corresponding to each parameter group respectively.

7. The method of claim 5, wherein parameters in the different parameter groups correspond to different media access control (MAC) control elements.

8. An information transmission device, comprising:
a processor; and
a memory including processor executable program, wherein the processor executable program upon execution by the processor configures the processor to:
establish an association relationship among a plurality of parameters associated with multiple component carriers configured for a user equipment (UE), wherein the plurality of parameters associated with the multiple component carriers comprise configuration parameters of a physical downlink control channel (PDCCH), the PDCCH including an indication of a control resource set (CORESET), wherein the plurality of parameters associated with the multiple component carriers corresponding to the same indication of the CORESET belong to a first parameter group of a plurality of parameter groups, wherein the indication of the CORESET includes a group index, wherein, within one bandwidth part (BWP), demodulation reference signal (DMRS) ports for a physical downlink shared channel (PDSCH) are different for different parameter groups of the plurality of parameter groups that are associated with the one BWP, and wherein time-frequency domain resources for the PDSCH corresponding to the different parameter groups overlap with each other; and
transmit information of the different parameter groups to the UE.

9. The information transmission device of claim 8, wherein the processor executable program upon execution by the processor configures the processor to independently indicate a downlink allocation index corresponding to each parameter group.

10. The information transmission device of claim 8, wherein parameters in the different parameter groups correspond to different media access control (MAC) control elements.

11. An information reception device, comprising:
a processor; and
a memory including processor executable program, wherein the processor executable program upon execution by the processor configures the processor to:
receive information of a plurality of parameter groups configured for a user equipment (UE) and an association relationship among a plurality of parameters associated with multiple component carriers configured for the UE;
wherein the plurality of parameters associated with the multiple component carriers comprise configuration parameters of a physical downlink control channel (PDCCH), the PDCCH including an indication of a control resource set (CORESET);
wherein the plurality of parameters associated with the multiple component carriers corresponding to the same indication of the CORESET belong to a first parameter group of the plurality of parameter groups, wherein the indication of the CORESET includes a group index;
wherein, within one bandwidth part (BWP), demodulation reference signal (DMRS) ports for a physical downlink shared channel (PDSCH) are different for different parameter groups of the plurality of parameter groups that are associated with the one BWP; and
wherein time-frequency domain resources for the PDSCH corresponding to the different parameter groups overlap with each other.

12. The information reception device of claim 11, wherein the processor executable program upon execution by the processor configures the processor to determine a downlink allocation index (DAI) corresponding to each parameter group respectively.

13. The information reception device of claim 11, wherein parameters in the different parameter groups correspond to different media access control (MAC) control elements.

* * * * *